July 9, 1935.  B. E. FOLKE  2,007,797
LUBRICATING SYSTEM
Filed Jan. 23, 1935  2 Sheets-Sheet 1
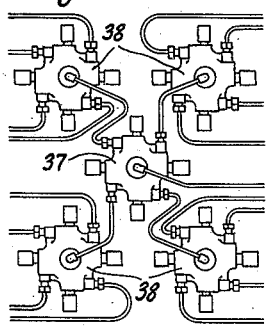
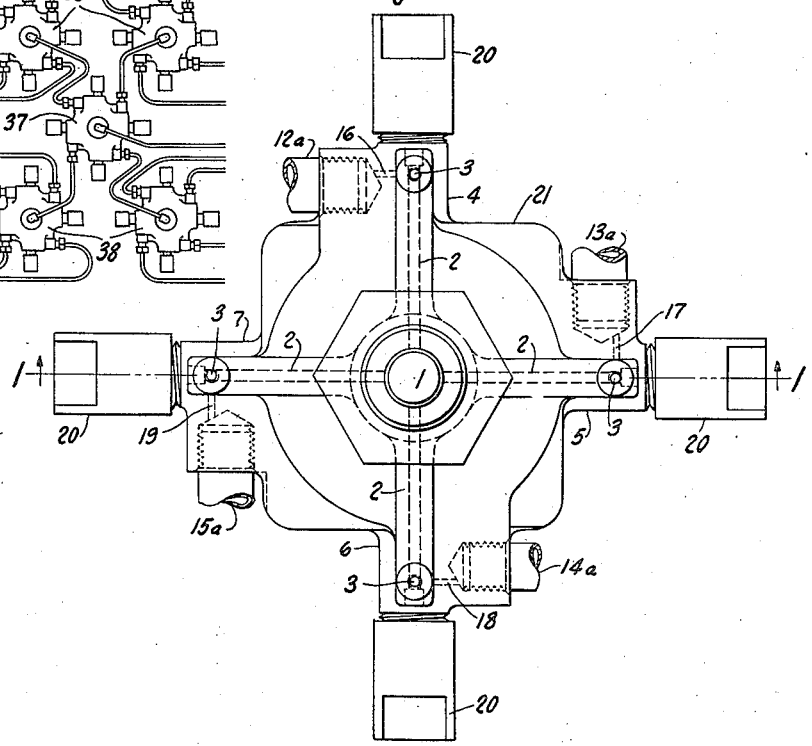
BENGT E. FOLKE
INVENTOR.
BY Walter E. Wallheim
ATTORNEY.

July 9, 1935.　　　B. E. FOLKE　　　2,007,797
LUBRICATING SYSTEM
Filed Jan. 23, 1935　　　2 Sheets-Sheet 2
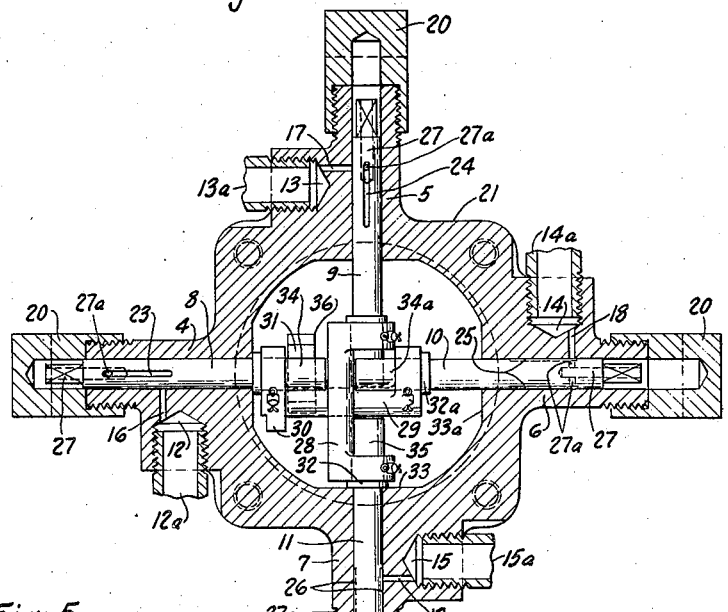
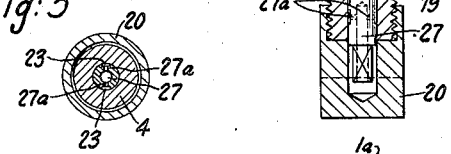
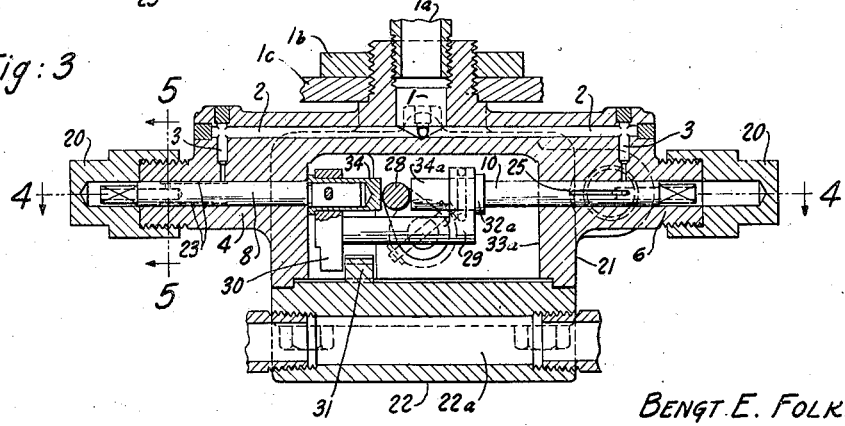
BENGT E. FOLKE
INVENTOR.
BY (signature)
ATTORNEY.

Patented July 9, 1935

2,007,797

UNITED STATES PATENT OFFICE 2,007,797

LUBRICATING SYSTEM

Bengt E. Folke, Mamaroneck Village, N. Y., assignor to Nathan Manufacturing Company, New York, N. Y., a corporation of New York Application January 23, 1935, Serial No. 3,087

10 Claims. (Cl. 184—7)

This invention relates to lubricating systems and has for its objects to provide hydraulic means by which a plurality of points may be lubricated with the least number of pipes, the means being particularly applicable for use with a force feed lubricator.

Several methods have been proposed to split or divide a flow of oil from a single pipe into two or more pipes; however, the methods heretofore in use, have the common disadvantage that the distribution of oil is affected by the differences in pressures required to force the lubricant to its terminals, so that a restricted outlet from one of the pipes discharges little or no oil, while a pipe with a wide open outlet discharges more oil than required.

It is the principal object of this invention to provide an apparatus to discharge oil from a single pipe in predetermined proportions into several pipes, the quantities of oil as discharged into each pipe being independent of the resistance or pressure in the pipes.

It is a further object to distribute or meter out and discharge oil, which is conducted to the apparatus under pressure from, for example, a force feed lubricator, into several pipes in such a manner that if due to obstructions or other causes one or more pipes should require a higher pressure than the others to force the oil through, the pressure will be correspondingly increased sufficiently to force a predetermined quantity of oil into such pipe and without affecting the amount of oil discharged into the remaining pipes.

Other objects will become apparent in the following specification and the accompanying drawings in which a preferred embodiment of the invention is shown.

In the drawings,

Fig. 1 is a cross-sectional view partially in elevation, along the plane of line 1—1 in Fig. 2, of an apparatus embodying the principles of my invention;

Fig. 2 is a plan view of the same;

Fig. 3 is a cross-sectional view partially in elevation, along the plane of line 3—3 in Fig. 1;

Fig. 4 is a horizontal sectional view, also partially in elevation, along the plane of line 4—4 in Fig. 3;

Fig. 5 is a cross-sectional view along the plane of line 5—5 in Fig. 3; and

Fig. 6 is a diagrammatic plan view of a combination of several of the apparatuses.

Like characters of reference denote similar parts throughout the several views and the following specification.

21 is a casing having an inlet opening 1 into which is screwed an inlet pipe 1a, inlet passages 2 and 3, cylinders 4, 5, 6 and 7, outlet openings 12, 13, 14 and 15, in communication with the cylinders through passages 16, 17, 18 and 19, and outlet pipes 12a, 13a, 14a and 15a screwed into outlet openings 12, 13, 14 and 15, respectively.

The casing is closed by a cover 22.

Pistons 8, 9, 10 and 11 are accurately fitted into cylinders 4, 5, 6 and 7.

The outer ends of cylinders 4, 5, 6 and 7 are closed, respectively, by caps 20. Pistons 8, 9, 10 and 11 are provided, respectively, with sets of two grooves each, numbered 23, 24, 25 and 26, the grooves in each piston being disposed approximately 180° apart, said grooves in certain positions communicating with inlet passages 3 or outlet passages 16, 17, 18 and 19. Grooves 23, 24, 25 and 26 also communicate with the ends of their respective cylinders formed by caps 20, through longitudinal passages 27 and cross passages 27a.

Pistons 8 and 10 are connected by means of a yoke 29 pinned thereto, and pistons 9 and 11 are connected by a similarly fastened yoke 28. Extensions 34 and 34a are placed over the ends of pistons 8 and 10, respectively, and form an integral unit with yoke 29. Similarly extensions 35 and 35a are placed over the ends of pistons 11 and 9, respectively, also forming an integral unit with yoke 28. Yoke 29 is provided with a lug 30, which engages cam 31, the latter forming a part of cover 22.

Cover 22 is provided with a duct 22a having its ends connected to a pipe conducting steam or other heating medium through it.

The device is supported upon a suitable bracket 1c shown fragmentarily in Figs. 1 and 3 by means of a nut 1b.

The operation of the device is as follows:

Oil under pressure from a feed of a force feed lubricator, for example, is admitted by pipe 1a to inlet opening 1 and conducted through inlet passages 2 and 3 to the top of each of the pistons 8, 9, 10 and 11. By referring to Fig. 4, it will be noted that the relative positions of pistons is such that one each of grooves 23 and 24 of pistons 8 and 9, respectively, are on top and thus register with inlet passages 3.

One each of grooves 25 and 26 of pistons 10 and 11, respectively, are closed to inlet passages 3, but open to outlet passages 18 and 19, respectively. Oil under pressure will flow through one of the grooves 24, cross passage 27a and longitudinal passage 27 of piston 9, and exert a pressure on the outer end of piston 9. However, piston 9 has already reached the end of its travel and is prevented from moving further by a shoulder 32 of extension 35 forming part of yoke 28 which contacts the casing at 33.

Simultaneously oil flows through one of the grooves 23, cross passage 27a and passage 27 and exerts pressure on the outer end of piston 8. The pressure exerted by the oil against piston 8 is transmitted through yoke 29 to piston 10. When sufficient pressure has been built up against piston 8 to overcome the opposing pressure on the outer face of piston 10, piston 8 will be pushed over from the one extreme of its travel in which it is shown in Fig. 4 to the other extreme of its travel. As will be readily understood, the oil previously trapped in cap 20 outside of piston 10 will be forced out through passage 27, cross passage 27a, one of the grooves 25 and passage 18, outlet opening 14, into pipe 14a.

Referring now to Fig. 3, as piston 8 moves through its travel, its extension 34 which contacts yoke 28, turns the yoke 28 and pistons 9 and 11 attached thereto sufficiently to bring one of the grooves 26 of piston 11 to its top position, thus establishing communication with one of the inlet passages 3, one of the grooves 26, cross passage 27a and passage 27 to the outer face of piston 11. Likewise piston 9 is turned until one of the grooves 24 closes its communication with the oil inlet passage 3 and the other groove 24 opens communication with outlet passage 17, outlet opening 13 and pipe 13a. The turning movement of pistons 11 and 9 will be completed and the passages fully open as just described when pistons 8 and 10 have completed their travel limited by contact of a shoulder 32a of extension 34a with the casing at 33a.

Should the oil pressure on the outer end of piston 10 communicated from discharge pipe 14a be comparatively high, and at the same time the oil pressure on the outer end of piston 9 communicated from discharge pipe 13a be comparatively low, piston 11 would start moving piston 9 against the lesser resistance as soon as communication were established between one of the inlet passages 3, one of the grooves 26, cross-passage 27a and passage 27 to the outer face of piston 11, and before these passages were fully open and before the travel of pistons 8 and 10 were completed. To prevent this, yoke 29 is provided with lug 30, which slides or passes along the sides of cam 31, preventing pistons 11 and 9 from starting before pistons 8 and 10 have completed their stroke. Cam 31 is proportioned to permit lug 30 to slide along one of its four sides and then to pass around one of its corners at the extreme end of each stroke, and thus assures a fixed stroke for each piston. When pistons 8 and 10 have reached their extreme travel position, lug 30 has moved sufficiently to clear cam 31 and permits pistons 11 and 9 to move, forced by the pressure of the oil conducted to the outer end of piston 11. Piston 9 forces the oil trapped in its cap 20 through outlet passage 17 and outlet opening 13.

In like manner and as previously described for piston 8, piston 11 by means of piston extension 35 now causes yoke 29 and attached pistons 8 and 10 to be turned until one of the grooves 25 of piston 10 communicates with the oil inlet opening 3, and one of the grooves 23 of piston 8 communicates with the oil outlet passage 16, opening 12 and pipe 12a.

When pistons 11 and 9 have completed their stroke, lug 30 of yoke 29 will again be free of cam 31, having passed around one of its corners 36 as shown in Fig. 4, permitting pistons 10 and 8, actuated by the oil pressure on the outer face of piston 10, to complete their travel, discharging oil through outlet 12 and again turning pistons 9 and 11, completing the cycle and bringing pistons, grooves and passages back to the starting positions and exactly as shown in Fig. 4.

From the foregoing description it will be readily understood that the amount of oil discharged into each outlet will depend only on the diameter and stroke of the oil pistons, and as all outlets are at all times separated from each other and from the oil inlets, the amount of oil discharged is independent of differences in pressures which may be required to force the oil through the several oil outlets.

In Fig. 6 I have illustrated a lubricating system in which one oil inlet from, for example, a force feed lubricator is connected to one oil distributor 37, the outlet branches of which are in turn connected to the inlet openings of several similar oil distributors 38, each receiving a predetermined amount of oil from the outlets of the primary distributor 37 and each of the secondary set of distributors 38 discharging a predetermined amount into a plurality of discharge lines, independent of the individual pressures in the discharge lines.

The primary distributor 37 discharges oil successively through each of its four outlets in the manner described to the secondary distributors 38, causing oil to be discharged through one outlet of each secondary distributor 38 during one cycle of the primary distributor 37.

As each of the secondary distributors 38 has four outlets, it follows that the primary distributor 37 must complete four cycles before oil has been discharged through all sixteen outlets. Thus each outlet receives oil during one-sixteenth of the complete cycle of the system. This action is highly desirable where a great number of points are to be lubricated, each of which requires a very small amount of oil.

Another desirable result of this invention and especially when used as described in the preceding paragraph, is that the total flow of oil from the main inlet is directed into only one of the plurality of outlets at one time and for a short period of time, until a measured amount of oil has been discharged, when the flow of oil is directed into the next discharge line and so in turn to the next until all outlets have received their share when the cycle is again repeated. In this manner a sufficient amount of oil is discharged at fixed intervals to each point of lubrication, permitting proper spreading of the oil over a bearing surface. Where the oil is fed continually, a correspondingly greater amount is required to properly distribute itself over each bearing surface, and especially to lubricate bearing surfaces which are not in perfect alignment.

A further advantageous characteristic of this system is that the comparatively rapid flow of oil in the discharge line has a tendency to dislodge and carry away any foreign matter present in the oil and prevent the oil pipes and especially the remote outlet openings from becoming obstructed.

This system eliminates the necessity for a great number of pumping units and corresponding pipe lines from the main lubricator to each individual point to be lubricated and also eliminates the great difficulty of properly adjusting a number of individual feeds.

While I have illustrated an oil distributor having one inlet and four outlets, it will be readily understood that the invention is not limited to a specific number of outlets or to the specified construction as shown herein. Furthermore, while I have explained the application of the distributor in connection with a force feed lubricator, the same device may be employed for distributing equally any liquid under pressure.

It is understood that various other changes of form, proportions and minor details of construction may be resorted to without departing from the principles or sacrificing any of the advantages of the invention as defined in the appended claims.

What I claim as new, is:

1. In a lubricating system, a main supply of oil under pressure, a distributor having a plurality of separated chambers with inlets and outlets, a plurality of pairs of coacting pistons, each of the said chambers receiving one of the said pistons, the said pistons being reciprocated by oil from the main supply admitted into one chamber to discharge a fixed volume of oil from another chamber when in communication with its respective outlet, each pair being actuated by another pair of pistons, and means in cooperation with one pair of pistons to control communication between said main supply and said inlets, and said chambers and said outlets, of another pair.

2. In a lubricating system, a main supply of oil under pressure, a distributor having a plurality of separated chambers with inlets and outlets, valve means controlling communication between said main supply and said inlets, and said chambers and said outlets, and pistons, oscillating and reciprocating within said chambers and reciprocated by the pressure in the main supply and operable to control communication between said main supply and said inlets and said chambers and said outlets by their oscillatory movement and to force oil from the said chambers by their reciprocatory movement.

3. In a lubricating system, a main supply of oil under pressure, a distributor having a plurality of separated chambers with inlets and outlets, valve means controlling communication between said main supply and said inlets, and said chambers and said outlets, pistons, oscillating and reciprocating within said chambers and reciprocated by the pressure in the main supply and operable to control communication between said main supply and said inlets and said chambers and said outlets by their oscillatory movement and to force oil from the said chambers by their reciprocatory movement, and means causing the reciprocatory movement of one piston to impart oscillatory movement to another piston.

4. In a lubricating system, a main supply of oil under pressure, a distributor having a plurality of separated chambers with inlets and outlets, and pistons, upon oscillation, controlling communication between said main supply and said inlets, and said chambers and said outlets, the said pistons being reciprocated by the pressure in the main supply to force oil from the said chambers, the reciprocation of one piston oscillating another piston.

5. In a lubricating system, a main supply of oil under pressure, a distributor having a plurality of separated chambers with inlets and outlets, and pistons, upon oscillation, controlling communication between said main supply and said inlets, and said chambers and said outlets, the said pistons being reciprocated by the pressure in the main supply successively to admit oil into and force oil from the said chambers, the reciprocation of one piston oscillating another piston.

6. In a lubricating system, a main supply of oil under pressure, a distributor having a plurality of separated chambers with inlets and outlets, a plurality of interlocked pairs of pistons, each of the said chambers receiving one of the said pistons, the pistons being reciprocated by oil from the main supply admitted into one chamber to discharge oil from another chamber, and means in cooperation with the said pistons controlling communication between said main supply and said inlets, and said chambers and said outlets.

7. In a lubricating system, a main supply of oil under pressure, a distributor having a plurality of separated chambers with inlets and outlets, a plurality of interlocked sets of pistons, each of the said chambers receiving one of the said pistons, the pistons being reciprocated by oil from the main supply admitted into one chamber to discharge oil from another chamber, and means in cooperation with the said pistons to control communication between said main supply and said inlets, and said chambers and said outlets, the reciprocation of one set of pistons moving another set to operate the communication control means of said other set.

8. In a distributor of the kind described, having an inlet in communication with a main supply of oil under pressure, a plurality of interlocked pairs of pistons, a chamber with an inlet and outlet at the end of each of the pistons, each pair of pistons being reciprocated by oil from the main supply admitted into the chamber at the end of one of the pistons and to discharge oil from the chamber at the end of the other piston of the same pair, the reciprocation of the said pistons alternately filling the chambers and discharging oil therefrom and the reciprocation of one pair of pistons moving another pair to control inlets and outlets from the chambers of the said other pair and to repeat the cycle of operation.

9. In a distributor of the kind described, having an inlet in communication with a main supply of oil under pressure, a plurality of interlocked pairs of pistons, a chamber with an inlet and outlet at the end of each of the pistons, each pair of pistons being reciprocated by oil from the main supply admitted into the chamber at the end of one of the pistons and to expel the said oil from the same chamber by oil from the main supply admitted into the chamber at the end of the other piston of the same pair, the reciprocation of one pair of pistons moving another pair to control inlets and outlets from the chambers of the said other pair and to repeat the cycle of operation.

10. In a distributor of the kind described, having an inlet in communication with a main supply of oil under pressure, a plurality of pairs of pistons, a chamber with an inlet and outlet at the end of each of the pistons, each pair of pistons being reciprocated by oil from the main supply admitted into the chamber at the end of one of the pistons and to discharge oil from the chamber at the end of the other piston of the same pair, the reciprocation of one pair of pistons moving another pair to control, by oscillation, the inlets to and outlets from the chambers of the said other pair.

BENGT E. FOLKE.